United States Patent [19]

Combes et al.

[11] Patent Number: 4,797,027
[45] Date of Patent: Jan. 10, 1989

[54] AUTOMATIC LEVEL-REGULATING SLUICE

[75] Inventors: Gilles Combes, Grenoble; Germain Delage, Montbonnot St Martin, both of France

[73] Assignee: Alsthom, Paris, France

[21] Appl. No.: 61,367

[22] Filed: Jun. 15, 1987

[30] Foreign Application Priority Data

Jun. 13, 1986 [FR] France ................... 86 08560

[51] Int. Cl.$^4$ .............................. F02B 7/20
[52] U.S. Cl. ............................ 405/92; 405/80; 405/87; 137/123
[58] Field of Search .............. 405/92, 94, 96, 87, 405/93; 137/123, 130, 135, 142, 143

[56] References Cited

U.S. PATENT DOCUMENTS 2,851,861  9/1958  Ponsar .
3,221,504 12/1965  Turney ..................... 405/93
3,331,208  7/1967  Aubert ..................... 405/92 X

FOREIGN PATENT DOCUMENTS 0083800  7/1983  European Pat. Off. .
1095751 12/1960  Fed. Rep. of Germany .
3023558  1/1982  Fed. Rep. of Germany .
0048512  3/1984  Japan ..................... 405/92
5948512  3/1984  Japan .
0589332  1/1978  U.S.S.R. ................... 405/94
0885421 12/1981  U.S.S.R. ................... 405/94

OTHER PUBLICATIONS

Patents Abstracts of Japan, vol. 8, No. 152, (M-309) (1589), Jul. 14, 1984.

Primary Examiner—Dennis L. Taylor
Attorney, Agent, or Firm—Sughrue, Mion, Zinn, Macpeak, and Seas

[57] ABSTRACT

The sluice oscillates about a shaft (16) in order to control the level of a downstream reach (4) to occupy a reference level as defined by the position of an opening (36) for connection to the atmosphere and suitable for being closed by a needle (38) carried on a float (40). The plate (6) is driven by a caisson (18) which is immersed in the upstream reach (2) and which contains a quantity of water (28) that is increased by sucking air via a hydraulic Venturi (50) driven by the flow of water between the two reaches. The displacements of the float (40) control the pressure reduction which is actually applied to said caisson in such a manner as to obtain the desired level control. The invention is applicable to controlling irrigation networks.

7 Claims, 2 Drawing Sheets

AUTOMATIC LEVEL-REGULATING SLUICE

The present invention relates to regulating a water level, for example in a canal reach or in a reservoir forming a portion of an irrigation network. The invention relates more particularly to a sluice for providing such regulation automatically.

One such sluice is described in the documents "Patents Abstracts of Japan, Vol. 8, No. 152 (M-309) (1589), July 14, 1984"; and "Japanese patent specification No. JP-A-59 48 512 (Houkody Kogyo K.K) Mar. 19, 1984". It comprises a plate which separates an upstream reach from a downstream reach and which is carried on a frame at a distance upstream from a transverse horizontal shaft in such a manner that oscillations of said frame are accompanied by substantially vertical motion of said plate. This motion is driven by a driving caisson which is partially immersed in the water of the upstream reach. The downstream reach is the "controlled reach", i.e. the reach whose level is to be maintained approximately constant. The controllable driving action of the caisson results from the fact that a controllable quantity of water is present in the bottom portion thereof, said quantity being controlled by the pressure of the air in the top portion thereof. The air is maintained at reduced pressure relative to the atmosphere by an air-driving system constituted by jets of water passing through a perforated partition separating two internal compartments of the caisson. The jets are formed by a difference in water level which is dynamically maintained between said two compartments by bottom openings which are suitably oriented for this purpose relative to the flow of water beneath the caisson.

The reduced air pressure created in this way inside the caisson constitutes a "primary" pressure reduction. It is limited in controlled manner by a sensor constituted by a duct which connects the top portion of the driving caisson to an air inlet opening situated at a suitable height in the downstream reach. This opening is closed by the water when the level in said reach rises too far.

This prior art sluice suffers, in particular, from the drawback that the primary air pressure reduction essential for its operation depends directly on the presence, the direction, and the speed of the flow of water beneath the plate. It is absent if the sluice is closed. It is greatly altered if an obstacle deflects the flow even slightly just upstream from the plate.

The aim of the present invention is to provide more reliable and more accurate operation of such a regulating sluice in a simple manner.

The present invention provides an automatic level-regulating sluice, comprising:

a plate located in a throat for separating an upstream reach from a downstream reach, one of said reaches being a controlled reach whose level is to be maintained, said plate being movable by a motion including a vertical component for closing said throat to a greater or lesser extent to pass a greater or lesser water flow-rate, and thereby counteract possible variations in level;

a moving driving caisson whose motion includes a vertical component linked to the vertical component of the plate motion, said caisson having a variable depth thereof immersed in the water in order to receive a variable flotation thrust therefrom;

said caisson having a bottom opening for enabling water to enter into said caisson and occupy a variable depth bottom portion thereof in order to increase the total weight acting on said caisson so that the resulting vertical force of said thrust and said weight may optionally cause said plate to move;

said caisson also having top opening for enabling air to leave the remaining top portion of the caisson and/or to enter said top portion;

said sluice further including a source of low pressure air for setting up a primary pressure reduction relative to the atmosphere;

an air circuit itself including a low pressure feed branch and/or a low pressure exhaust branch, with at least one of said branches being controllable in such a manner as to put said top portion into communication with said source and with the atmosphere, in order respectively to cause water to penetrate into said caisson and to cause it to depart therefrom; and a level sensor sensitive to the difference in level between said controlled reach and a reference level, said sensor controlling said controllable branch in order to apply an effective reduced air pressure to said driving caisson, said effective reduced air pressure being a controllable fraction of said low pressure provided by said source, said sensor causing said fraction to vary in a manner which is controlled by the level of said reach and of said reference level;

said sluice being characterized by the fact that said low pressure source is a hydraulic suction Venturi, said Venturi comprising a water inlet fed from said upstream reach, a converging portion, an air suction inlet, a diverging portion and a water and air outlet opening out towards said downstream reach in order to cause said primary reduction in air pressure to appear at said suction inlet.

If said controlled reach is the downstream reach said sensor controls said air circuit as follows:

in response to an increase in the level of said downstream reach above the reference level it closes, at least partially, said exhaust branch and/or simultaneously opens said feed branch, and in response to a drop of the level in said reach below the reference level it provides control in the opposite direction.

If it is the upstream reach, said sensor controls said air circuit as follows:

in response to an increase in the level of said upstream reach above the reference level it opens, at least partially, said exhaust branch and/or simultaneously closes said feed branch, and in response to a drop of the level in said reach below the reference level it provides control in the opposite direction.

There follows a description of how the invention may be implemented within the scope of the definition given above by way of non-limiting example and with reference to the accompanying diagrammatic figures. When the same item is shown in several of the figures it is designated therein by the same reference symbol.

Wherever said reference symbols have been used above it is for the purpose of reference by way of non-limiting example to the same figures. It should be understood that the items specified may be replaced by other items which provide the same technical functions.

Figure 1:
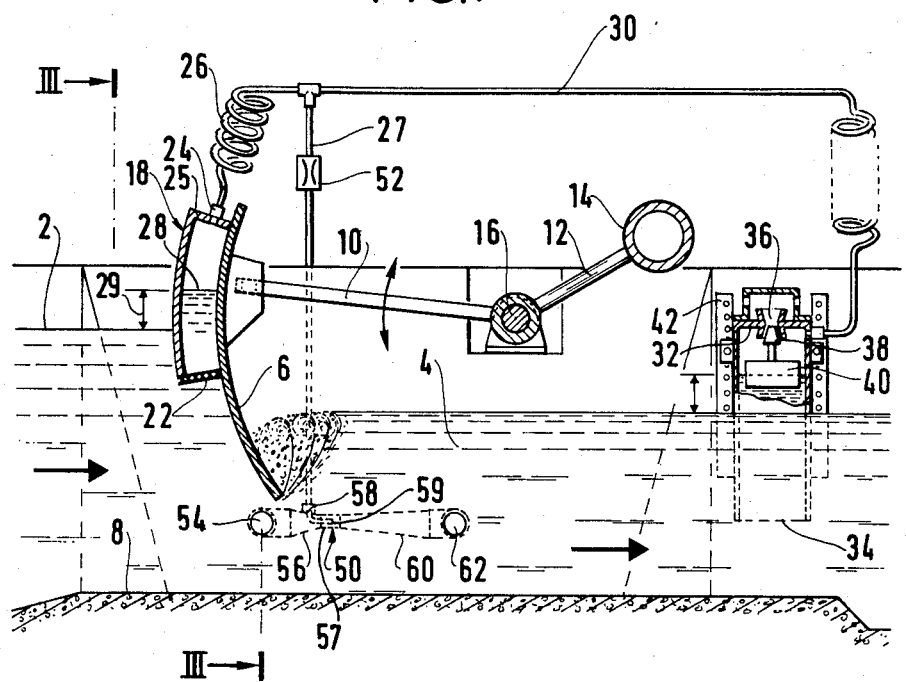
FIG. 1 shows a first sluice in accordance with the invention suitable for regulating the level of a downstream reach, said sluice being shown in section on a longitudinal vertical plane I—I of FIG. 2.
Figure 2:
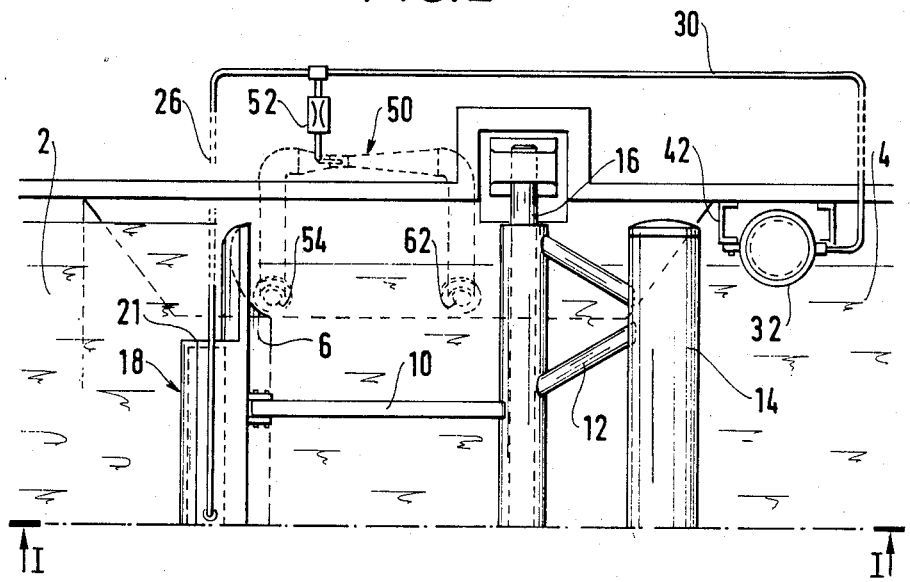
FIG. 2 is a fragmentary plan view of said sluice.
Figure 3:
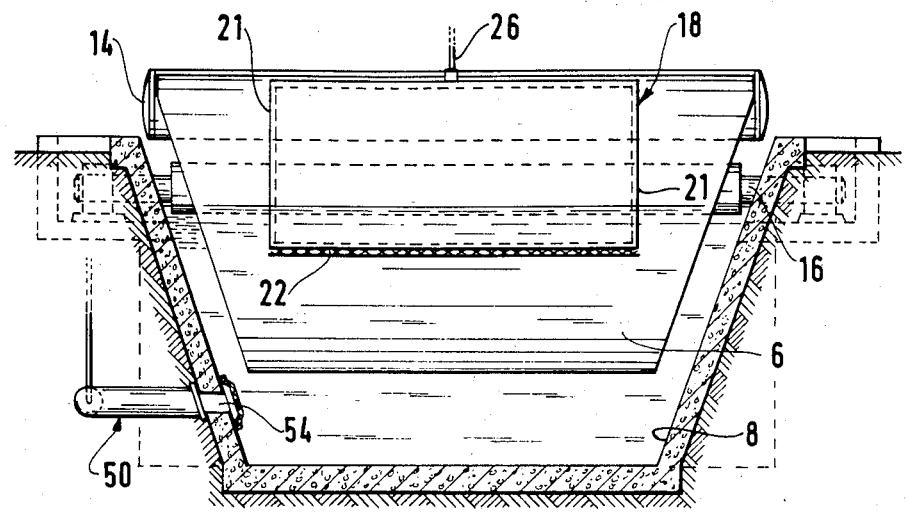
FIG. 3 is a section view through said sluice on a vertical transverse plane III—III of FIG. 1.

An irrigation network includes an upstream reach 2 and a downstream reach 4 separated by a sluice having a metal plate 6 which moves in a concrete throat 8 and which may, optionally, close said throat entirely. The direction of flow is parallel to the plane of FIG. 1 and is referred to herein as "longitudinal".

The plate is mounted at the end of an upstream branch 10 of a metal frame having a downstream branch 12 which carries a counterweight 14. The frame oscillates about a transverse horizontal shaft 16 situated approximately at the water level in the upstream reach 2.

The plate 6 is in the form of an angular sector of a circular cylinder about the axis of the shaft 16. It has a caisson 18 on its upstream face with the upstream wall 20 of the caisson being cylindrical and coaxial, and with its side walls 21 being vertical. A submerged bottom opening 22 of the caisson is protected by a grating. A top opening 24 is made through the top wall 25. It is connected to a flexible pipe 26 which is connected to a suction pipe 27 which constitutes the above-mentioned low pressure feed branch for sucking air from the caisson to a greater or lesser extent. This suction raises the internal level of the water 28 which enters the caisson via its bottom opening 22 to a greater or lesser extent relative to the level in the upstream reach 2, with the difference in level being referenced 29.

The pipe 26 is also connected to a control pipe 30 which constitutes a portion of the above-mentioned low pressure exhaust branch. This branch is likewise put at low pressure by the suction pipe 27. It opens out into the top portion of a sensor chamber 32 whose bottom portion 34 opens out into the downstream reach 4.

This chamber also has a top opening 36 which may be closed to a greater or lesser extent by a conical needle 38 with an upwardly directed point and carried on a float 40 which floats inside said chamber. The cross-sectional area of the air passage reduces with increasing level of the water in the reach 4 and consequently in the chamber 32. The level of the water in the enclosure rises faster than in the reach 4 by virtue of the increasing air pressure drop, which accelerates closure of the orifice 3b.

The chamber 32 is normally fixed. However, it may be fixed at various different levels on vertical support strips 42 for changing the reference level of the reach 4. This may also be obtained by adjusting the height of the needle 38 above the float 40, by means of a threaded rod (not shown) carrying said needle and screwing to a greater or lesser extent into said float.

The pressure in the suction pipe 27 is reduced by a hydraulic suction Venturi construction 50 via a throttle 52 which constitutes the above-mentioned air flowrate limiter. Said Venturi constitutes said source of reduced pressure and comprises a water inlet 54 which opens out into the upstream reach 2 via a grating and which feeds a converging length of tube 56. The converging length gives rise to a high speed and low pressure flow in a throat 57, thereby entraining air from an air inlet 58 which communicates with the suction pipe 59 on the throat axis. The mixture of water and air is taken up by a diverging length 60 which opens out via an outlet 62 into the downstream reach 4.

In one particular case, the water flowrate through the sluice may be $10 = m^3/s$ (cubic meters per second). The upstream level may vary between 1.40 m and 2 m, and the downstream level between 1.20 m and 1.70 m. The water Venturi is placed at a depth of 1 m, with a diameter of 150 mm at the inlet to to converging length, a diameter of 75 mm in the throat, and a diameter of 150 mm at the outlet from the diverging length. The converging length is 200 mm long, the throat is 75 mm long, and the diverging length is 615 mm long. The air suction pipe on the throat axis has an inside diameter of 10 mm and an outside diameter 12 mm. This Venturi provides sufficient pneumatic power to operate the sluice and the water leakage rate is acceptable.

Figure 4:
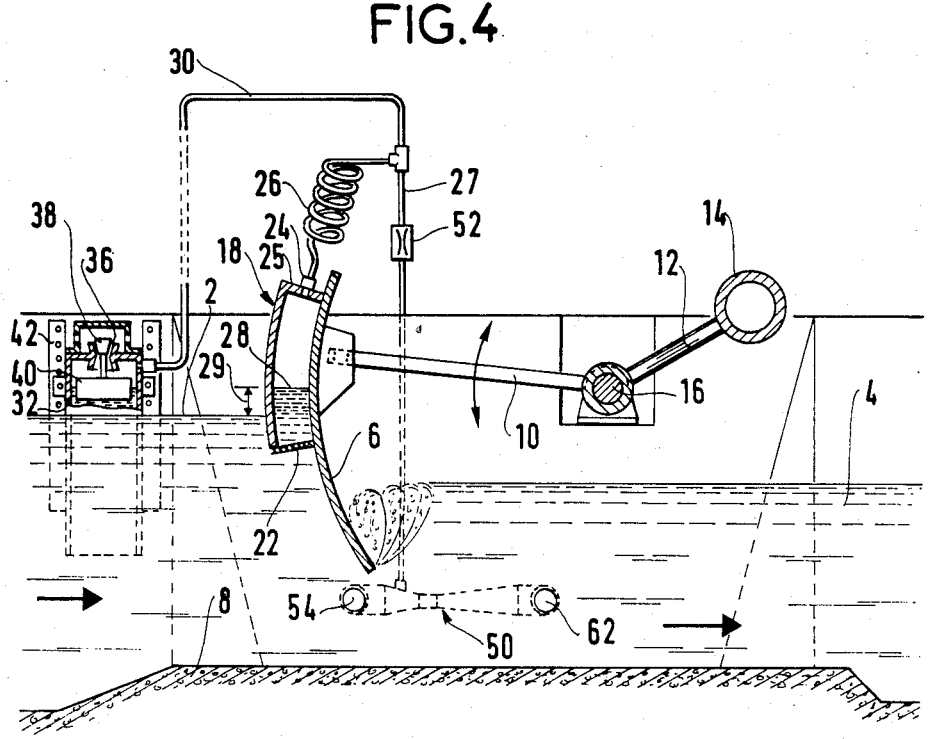
FIG. 4 shows the same sluice in accordance with the invention, but adapted to regulating the level of the upstream reach, said figure being a section on a longitudinal plane analogous to that of FIG. 1.

The sluice in accordance with the invention as shown in FIG. 4 is the same as that described above except that in order to regulate the level of the upstream reach 2, the chamber 32 containing the float 40 is placed in the upstream reach. In addition, the needle 38 has its point downwardly directed so as to close the opening 36 when the level drops.

Naturally, if the mode of operation of the sluice is to be changed frequently so that it often maintains the level of the upstream reach and often maintains the level of the downstream reach, two separate chambers such as 32 are provided each having its own float such as 40 and its own closure needle such as 38, with one being placed in the upstream reach and the other in the downstream reach. The mode of operation is then selected by connecting the control pipe 30 to one or other the two chambers.

We claim:

1. An automatic level-regulating sluice, comprising:

a plate (6) located in a throat (8) for separating an upstream reach (2) from a downstream reach (4), one of said reaches being a controlled reach whose level is to be maintained, said plate being movable by a motion including a vertical component for closing said throat to a greater or lesser extent to pass a greater or lesser water flowrate, and thereby counteract possible variations in level;

a moving driving caisson (18) whose motion includes a vertical component linked to the vertical component of the plate motion, said caisson having a variable depth thereof immersed in the water in order to receive a variable flotation thrust therefrom;

said caisson having a bottom opening (22) for enabling water (20) to enter into said caisson and occupy a variable depth bottom portion thereof in order to increase the total weight acting on said caisson so that the resulting vertical force of said thrust and said weight may optionally cause said plate to move;

said caisson also having top opening (24) for enabling air to leave the remaining top portion of the caisson and/or to enter said top portion;

said sluice further including a source of low pressure air (50) for setting up a primary pressure reduction relative to the atmosphere;

an air circuit itself including a low pressure feed branch (27) and/or a low pressure exhaust branch (30), with at least one of said branches being controllable in such a manner as to put said top portion (24) into communication with said source and with the atmosphere, in order respectively to cause water to penetrate into said caisson and to cause it to depart therefrom; and a level sensor (40) sensitive to the difference in level between said controlled reach (4) and a reference level, said sensor controlling said controllable branch (30, 32, 36) in order to apply an effective reduced air pressure to said driving caisson (6), said effective reduced air pressure being a controllable fraction of said low pressure provided by said source, said sensor causing said fraction to vary in a manner which is controlled by the level of said reach and of said reference level;

said sluice being characterized by the fact that said low pressure source (50) is a hydraulic suction Venturi, said Venturi comprising a water inlet (54) fed from said upstream reach (2), a converging portion (56), an air suction inlet (58), a diverging portion (60), and a water and air outlet (62) opening out towards said downstream reach (4) in order to cause said primary reduction in air pressure to appear at said suction inlet.

2. A sluice according to claim 1, suitable for the case where said controlled reach is the downstream reach (4), and characterized by the fact that said sensor (40) controls said air circuit (52, 27, 30, 32, 36) as follows:

in response to an increase in the level of said downstream reach above the reference level it closes, at least partially, said exhaust branch (30, 32, 36) and/or simultaneously opens said feed branch, and in response to a drop of the level in said reach below the reference level it provides control in the opposite direction.

3. A sluice according to claim 1, suitable for the case where said controlled reach is the upstream reach (2), and characterized by the fact that said sensor (40) controls said air circuit (52, 27, 30, 32, 36) as follows:

in response to an increase in the level of said upstream reach above the reference level it opens, at least partially, said exhaust branch (30, 32, 36) and/or simultaneously closes said feed branch, and in response to a drop of the level in said reach below the reference level it provides control in the opposite direction.

4. A sluice according to claim 1, characterized by the fact that said sensor (40) controls only said exhaust branch (30, 32, 36), so as to provide a simple embodiment of said air circuit.

5. A sluice according to claim 4, characterized by the fact that said energy exhaust branch (30, 32, 36) communicates with the atmosphere via a fixed chamber (32), with a bottom opening (34) of said chamber being situated beneath the water level to allow water in said controlled reach 94) to occupy a variable bottom portion of said chamber, said exhaust branch passing via the remaining top portion of said chamber, via a top opening (36) of said chamber and a top opening (36) of said chamber opening out into the atmosphere above the water level:

said sensor being constituted by a float (40) floating inside said chamber in such a manner as to be protected thereby, said float driving a moving shutter (38) to close said top opening in such a manner as to control said exhaust branch.

6. A sluice according to claim 5, characterized by the fact that said shutter is constituted by a needle (38) having a conical side surface about the axis of needle displacement, said top opening (36) being circular and coaxial with said needle in such a manner that said sensor (40) provides progressive control and that the movements of said plate (6) are also progressive.

7. A sluice according to claim 6, characterized by the fact that said needle (38) is fixed above said float (40), with its axis being vertical.

* * * * *